April 17, 1962 P. M. LASHLEY 3,030,486
HOT FOOD CONSERVING CABINET
Filed March 27, 1959 2 Sheets-Sheet 1
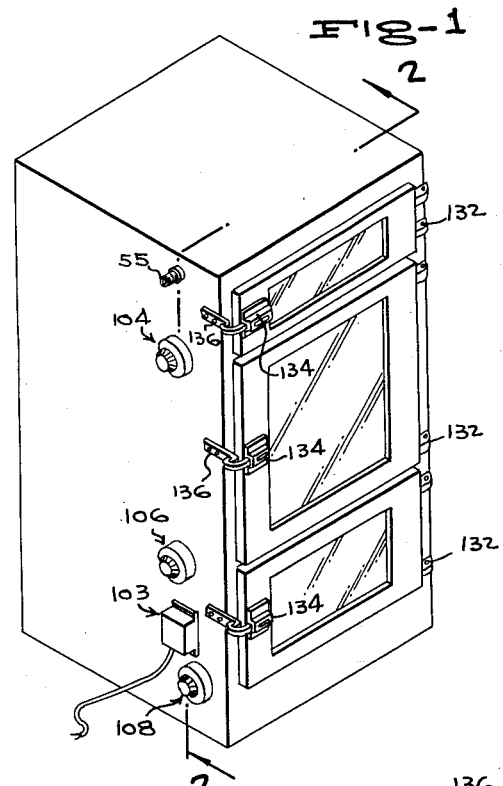
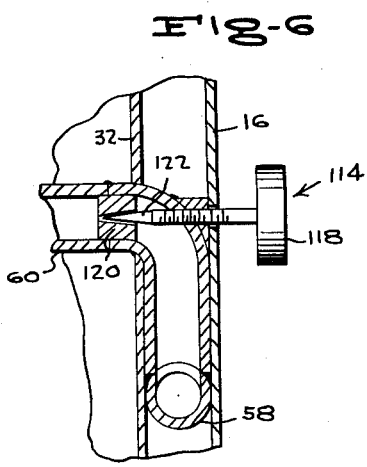
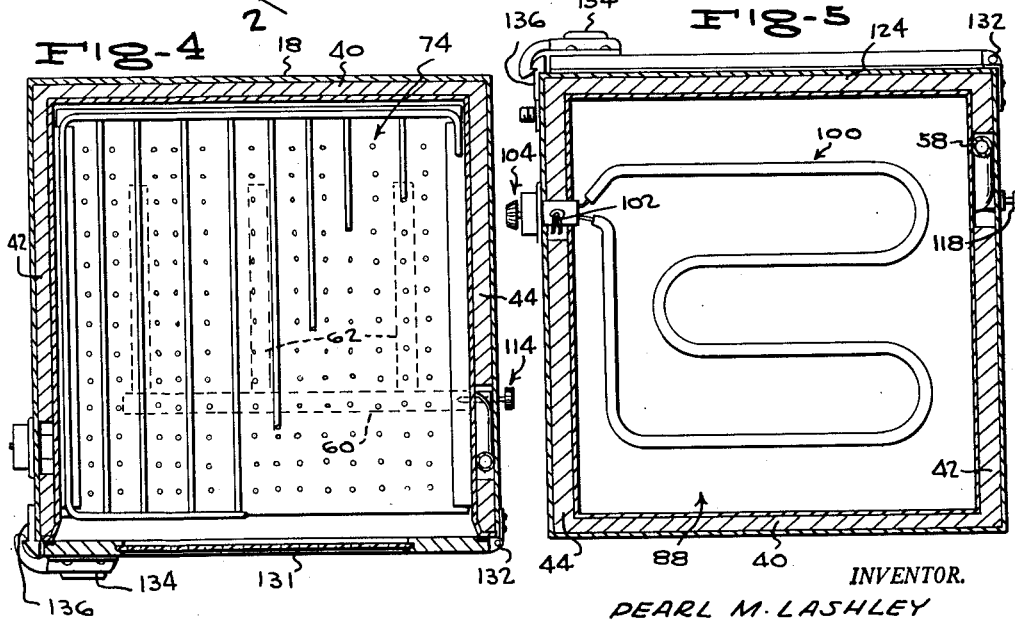
INVENTOR.
PEARL M. LASHLEY
BY
McMorrow, Berman & Davidson
ATTORNEYS April 17, 1962  P. M. LASHLEY  3,030,486
HOT FOOD CONSERVING CABINET
Filed March 27, 1959  2 Sheets-Sheet 2
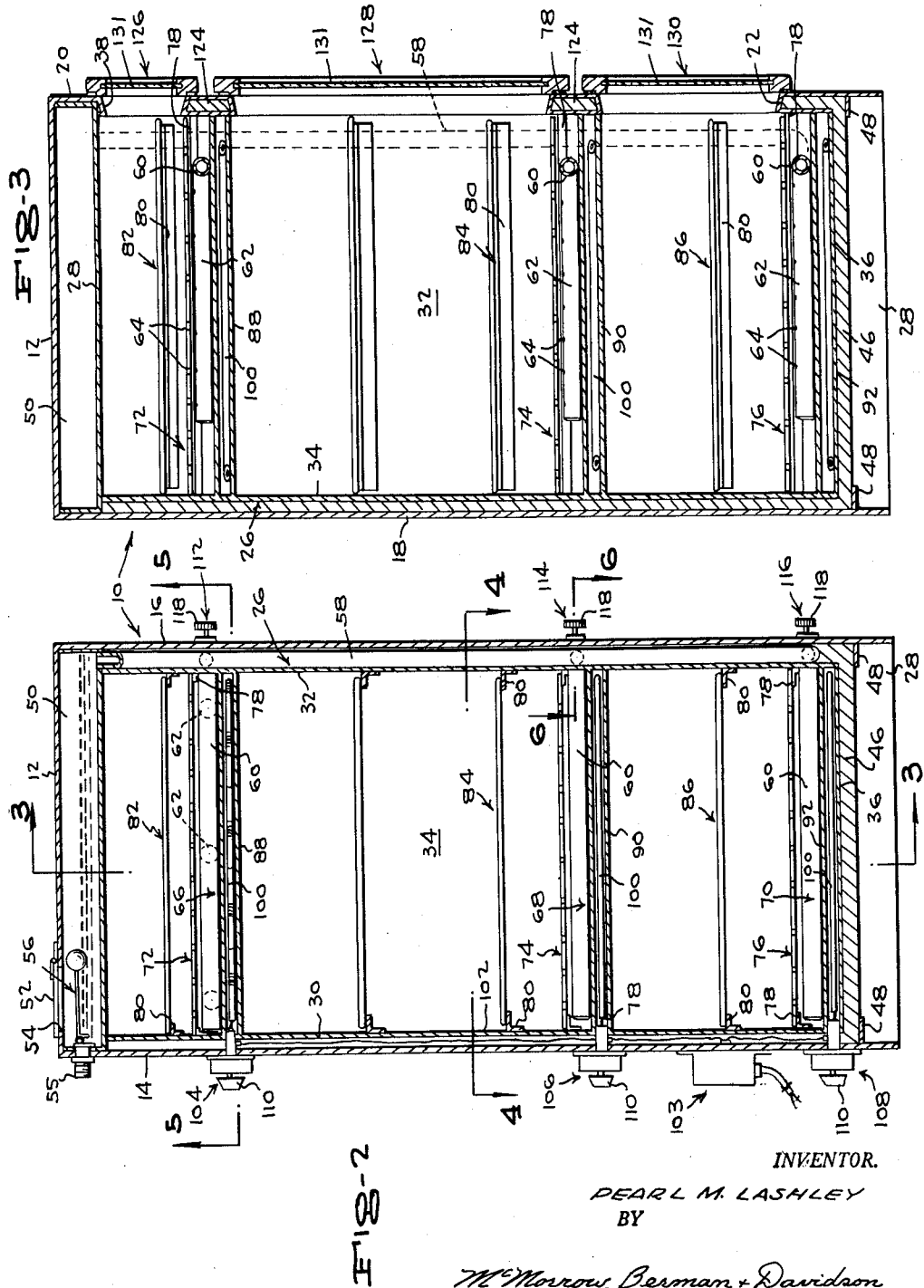
INVENTOR.
PEARL M. LASHLEY
BY
McMorrow, Berman + Davidson
ATTORNEYS United States Patent Office 3,030,486
Patented Apr. 17, 1962

3,030,486
HOT FOOD CONSERVING CABINET
Pearl M. Lashley, Rte. 3, Opp, Ala.
Filed Mar. 27, 1959, Ser. No. 802,344
7 Claims. (Cl. 219—35)

This invention relates to an improved heated food conserving cabinet.

The primary object of the invention is to provide a novel and improved cabinet of the kind indicated for automatically maintaining the original heat and moisture content of cooked foods.

Another object of the invention is to provide an electrically heated cabinet of the character indicated above, wherein the heating of water to supply moisturizing steam is automatically controlled to pre-set degrees, and the temperature within the cabinet is automatically controlled to pre-set degrees.

A further object of the invention is to provide a cabinet of the character indicated above which is divided into separate compartments, whose moisture and temperature can be individually determined and adjusted for the conservation of cooked foods of differing forms and kinds, and, if desired, for the purpose of the original heating of such as coffee.

A still further object of the invention is to provide an efficient and reliable cabinet of the character indicated above which requires no supervision, and which can be made in compact and attractive forms, at relatively low cost, suitable for use in homes, schools, motels, and small eating establishments.

Other important objects and advantageous features of the invention will be apparent from the following description and the accompanying drawings, wherein, for purposes of illustration only, a specific form of the invention is set forth in detail.

In the drawings:

FIGURE 1 is a front perspective view of a cabinet of the invention;

FIGURE 2 is an enlarged vertical longitudinal section taken on the line 2—2 of FIGURE 1;

FIGURE 3 is a vertical transverse section taken on the line 3—3 of FIGURE 2;

FIGURES 4 and 5 are horizontal sections taken on the lines 4—4 and 5—5, respectively, of FIGURE 2; and FIGURE 6 is a further enlarged fragmentary horizontal section taken on the line 6—6 of FIGURE 2.

Referring in detail to the drawings, wherein like numerals designate like parts throughout the several views, the illustrated cabinet comprises a vertically elongated, rectangular outer box or shell 10, preferably of insulating material, including metal, having a top wall 12, side walls 14 and 16, a back wall 18, a front wall 20 having a relatively large conformably shaped opening 22 therein, and, permissibly, an open bottom 24.

Supported spacedly within the outer box or shell 10 is an inner box or shell 26 comprising a top wall 28, side walls 30 and 32, a back wall 34, a bottom wall 36, and having a front opening 38 of the same size as the front opening 22 of the outer box or shell 10. The bottom, sides, back, and the lower end of the inner box 26 are spaced from the related walls of the outer box 10 by suitable insulation, which covers the inner box 26, as indicated at 40, 42 and 44 in FIGURES 3, 4 and 5, and at 46 in FIGURES 2 and 3, the portion 46 of the insulation resting upon brackets 48 on the outer box side walls to support the inner box 26 above the open bottom of the outer box 10.

The top wall 28 of the inner box 26 forms the bottom wall of a water reservoir 50, whose top wall is the top wall 12 of the outer box 10, and whose side walls are the back, side, and front walls of the outer box. The reservoir top wall is provided with a hinged cover 52 for an access opening 54. A pressure water supply connecting fitting 55 traversing the side wall 14 enters the reservoir 50 and has associated with its inner end a float valve 56 which serves to valve water from the supply so as to maintain a predetermined water level in the reservoir.

Extending downwardly from the reservoir 50 to the lower part of the inner box 26, in space provided between the side walls 16 and 32 is a single vertical water supply pipe 58 which, at determined vertically spaced intervals, has single laterally inwardly extending horizontal closed branches 60, each of which has projecting rearwardly therefrom a plurality of spaced, horizontal closed arms 62. The arms 62 and the branches 60 constitute steamers, and have in their upper sides, small steam emitting perforations 64. The steamers consist of upper, intermediate, and lower steamers 66, 68, and 70, respectively, which are located spacedly beneath perforated upper, intermediate and lower baffle plates 72, 74 and 76, respectively, which are all similarly and removably supported on brackets 78 in the inner box side walls 30, 32.

Supported removably on other brackets 80 on the side walls 30, 32 and spaced above the perforated baffle plates 72, 74 and 76, are removable open-work food supporting shelves 82, 84 and 86, respectively, such as ordinary refrigerator shelves.

Extending between and fixed on the inner box side walls 30, 32 are flat horizontal upper, intermediate, and lower heater casings 88, 90 and 92, which are located immediately beneath the related steamers 66, 68 and 70, respectively, whereby water present in the steamers is heated to form steam which rises from the perforations of the compartment defining plates 72, 74 and 76, to moisturize the upper, intermediate and lower food compartments 94, 96 and 98, thereabove, and food (not shown), resting upon the shelves therein.

Enclosed within the casings 88, 90 and 92 are similar electric heating elements 100, which are energized by a cable 102 leading from an outlet or connector box 103, connectible to an available current source (not shown). Effectively connected in the conductors of the cable 102, which extends in the space between the box side walls 14 and 30, are individual upper, intermediate and lower thermostatic switches 104, 106 and 108, which are mounted on and extend through the side walls 13 and 32, and have external temperatures within selected compartments and the generation of steam therein.

For the purpose of further controlling the steaming of, and hence the amount of moisture provided thereby in the individual compartments, and to reduce the flow of water from the vertical pipe 58 into the individual branches 60 there are provided at the junctures of the vertical water pipe 58 and the branches 60 of the steamers, individual upper, intermediate and lower valves 112, 114 and 116 respectively, which have operating knobs 118 located outside of the cabinet. As shown in FIGURE 6, the valves can comprise seats 120 in the branches, in which valve needles 122, operated by the knobs 118 can be adjustably seated.

The adjustments of the valves 112, 114, and 116 determine the amount of water entering the steamers. The operator of the cabinet decides how much steam is to be generated in and discharged from the individual steamers for the moisturizing and heating of different foods in related compartments of the cabinet, and determines, by experiment, the proper adjustments of the valves. During use and operation of the cabinet, very little water exists as such in the steamers because water entering the steamers, with the valves properly adjusted, is vaporized as it enters the steamers. The valves 112, 114 and/or 116 are adapted to be closed by the operator when the desired temperature moisture conditions are attained, and are adapted to be closed individually when any compartments are not in use.

Extending across the front opening of the boxes, as indicated in FIGURE 3, are horizontal divider bars 124 which cover the forward ends of and the spaces between related heater casings, steamer, and perforated divider plates. Suitable upper, intermediate, and lower doors 126, 128 and 130, having transparent glass panels 131, are provided for the resultant compartment front openings, and are suitably hinged at one end on the related cabinet side, as indicated at 132, and have suitable latches 134 on their other ends for releasable engagement with keepers 136 mounted on the other side of the cabinet, whereby individual access is provided to each compartment.

By providing for individual and selective control of temperatures and moisture in each of the food compartments, and by isolating the compartments from each other by means of the heater casings, different foods can be maintained at different degrees of temperature and moisture needed to conserve the same, after cooking, to be subsequently served at their original temperature and moisture content.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A hot food conserving cabinet comprising a closed box having side walls and a top wall, a water reservoir in the cabinet at said top wall, a pressure water supply fitting entering said reservoir, float valve means in said reservoir for controlling flow of water into the reservoir, a vertical water supply pipe leading downwardly from said reservoir, a heating and moisturizing assembly comprising a horizontal perforated steamer spaced below said top wall and extending across said box between and supported on said side walls to which said water supply pipe is connected, said steamer having steam-passing perforations, valve means for controlling flow of water into the steamer, a perforated baffle plate above and overlying said steamer, an open-work food supporting shelf spaced above overlying said plate, a closed horizontal heater casing below said steamer and supportably extending across the box to serve as a bottom for said compartment, and an electric heating element enclosed in said casing.

2. A hot food conserving cabinet comprising a closed box having side walls and a top wall, a water reservoir in the cabinet at said top wall, a pressure water supply fitting entering said reservoir, float valve means in said reservoir for controlling flow of water into the reservoir, a vertical water supply pipe leading downwardly from said reservoir, a heating and moisturizing assembly comprising a horizontal perforated steamer spaced below said top wall and extending across said box between and supported on said side walls to which said water supply pipe is connected, said steamer having steam-passing perforations, valve means for controlling flow of water into the steamer, a perforated baffle plate above and overlying said steamer, an open-work food supporting shelf spaced above overlying said plate, a closed horizontal heater casing below said steamer and supportably extending across the box to serve as a bottom for said compartment, and an electric heating element enclosed in said casing, an electric cable leading to said heating element, and a thermostatic switch on a cabinet side wall connected in said cable and exposed to said heating element, said switch having a control outside of the cabinet for setting the switch to determine the heat produced by the heating element and the generation and emission of steam by the steamer.

3. A hot food conserving cabinet comprising a closed box having side walls and a top wall, a water reservoir in the cabinet at said top wall, a pressure water supply fitting entering said reservoir, float valve means in said reservoir for controlling flow of water into the reservoir, a vertical water supply pipe leading downwardly from said reservoir, a heating and moisturizing assembly comprising a horizontal perforated steamer spaced below said top wall and extending across said box between and supported on said side walls to which said water supply pipe is connected, said steamer having steam-passing perforations, a perforated baffle plate above and overlying said steamer, an open-work food supporting shelf spaced above overlying said plate, a closed horizontal heater casing below said steamer and supportably extending across the box to serve as a bottom for the compartment, and an electric heating element enclosed in said casing, an electric cable leading to said heating element, and a thermostatic switch on a cabinet side wall connected in said cable and exposed to said heating element, said switch having a control outside of the cabinet for setting the switch to determine the heat produced by the heating element and the generation and emission of steam by the steamer, and a water-controlling valve in said water supply pipe at its juncture with the steamer, said valve having a control element outside of the cabinet adjustable for determining the amount of water reaching the steamer from the water supply pipe for generation into steam by the heat of the heating element.

4. A food conditioning device for a food cabinet, comprising a reservoir having a pressure water inlet, a float valve control connected to the inlet for controlling the level of water in the reservoir, a water supply pipe leading downwardly from said reservoir, a heating and moisturizing assembly spaced below the reservoir and adapted to be installed in a food cabinet beneath a perforated food supporting shelf therein, said assembly comprising a tubular horizontal member having a closed end and another end connected to the water supply pipe, said member having a top wall provided therealong with steam emitting perforations, valve means located at the meeting of said member with the water supply pipe adapted to be adjusted to limit entrance of water into said member from the water supply pipe, a horizontal electrical heater supported beneath said member for heating said member, a thermostatic switch connected to said heater for automatically controlling the temperature of the heater and the temperature of the said member for vaporizing water entering said member, said switch having a control for adjusting the range of operation of the switch.

5. A hot food conserving cabinet comprising a closed box having side walls and a top wall, a water reservoir in the cabinet at said top wall, a pressure water supply fitting entering said reservoir, float valve means in said reservoir for controlling flow of water into the reservoir, a vertical water supply pipe leading downwardly from said reservoir, a heating and moisturizing assembly comprising a horizontal perforated steamer spaced below said top wall and extending across said box between and supported on said side walls to which said water supply pipe is connected, said steamer having steam-passing perforations, valve means for controlling flow of water into the steamer, a perforated baffle plate above and overlying said steamer, an open-work food supporting shelf spaced above overlying said plate, a closed horizontal heater casing below said steamer and supportably extending across the box to serve as a bottom for said compartment, and an electric heating element enclosed in said casing, said assembly being an upper assembly, said cabinet containing an intermediate heating and moisturizing assembly spaced below said upper heating and moisturizing assembly, and a lower heating and moisturizing assembly spaced below said intermediate heating and moisturizing assembly, said intermediate and lower assemblies being substantially similar to the upper assembly.

6. A hot food conserving cabinet comprising a closed box having side walls and a top wall, a water reservoir in the cabinet at said top wall, a pressure water supply fitting entering said reservoir, float valve means in said reservoir for controlling flow of water into the reservoir, a vertical water supply pipe leading downwardly from said reservoir, a heating and moisturizing assembly comprising a horizontal perforated steamer spaced below said top wall and extending across said box between and supported on said side walls to which said water supply pipe is connected, said steamer having steam-passing perforations, valve means for controlling flow of water into the steamer, a perforated baffle plate above and overlying said steamer, an open-work food supporting shelf spaced above overlying said plate, a closed horizontal heater casing below said steamer and supportably extending across the box to serve as a bottom for said compartment, and an electric heating element enclosed in said casing, said assembly being an upper assembly, said cabinet containing an intermediate heating and moisturizing assembly spaced below said upper heating and moisturizing assembly, and a lower heating and moisturizing assembly spaced below said intermediate heating and moisturizing assembly, said intermediate and lower assemblies being substantially similar to the upper assembly, the upper heater casing and said reservoir defining an upper food compartment therebetween, said upper heater casing and the heater casing of the intermediate assembly defining an intermediate food compartment therebetween, and the intermediate heater casing and the heater casing of the lower assembly defining a lower food compartment therebetween.

7. A food conditioning device for a food cabinet, comprising a reservoir having a pressure water inlet, a float valve control connected to the inlet for controlling the level of water in the reservoir, a water supply pipe leading downwardly from said reservoir, a heating and moisturizing assembly spaced below the reservoir and adapted to be installed in a food cabinet beneath a perforated food supporting shelf therein, said assembly comprising a tubular horizontal member having a closed end and another end connected to the water supply pipe, said member having a top wall provided therealong with steam emitting perforations, valve means located at the meeting of said member with the water supply pipe adapted to be adjusted to limit entrance of water into said member from the water supply pipe, a horizontal electrical heater supported beneath said member for heating said member, a thermostatic switch connected to said heater for automatically controlling the temperature of the heater and the temperature of the said member for vaporizing water entering said member, said switch having a control for adjusting the range of operation of the switch, said tubular member comprising a linear element connected directly to the water supply pipe and longitudinally spaced arms extending laterally from the linear elements, said arms having steam-emitting perforations in their top walls.

References Cited in the file of this patent

UNITED STATES PATENTS

| 1,279,205 | Wolff | Sept. 17, 1918 |
| 2,526,974 | Schipanski | Oct. 24, 1950 |
| 2,750,937 | Sjolund | June 19, 1956 |

FOREIGN PATENTS

| 502,841 | Great Britain | Mar. 27, 1939 |